Patented Dec. 16, 1941

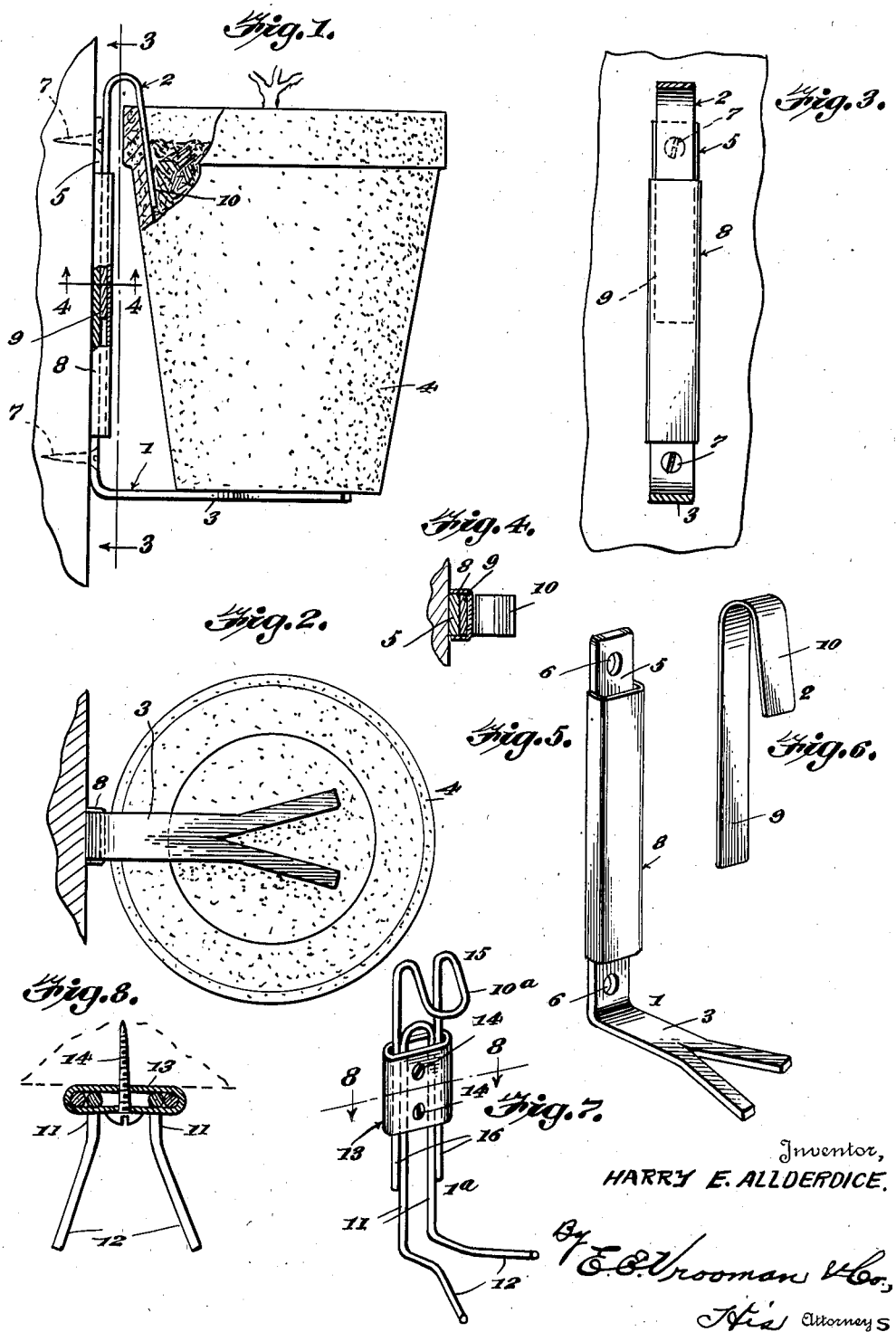

2,266,294

UNITED STATES PATENT OFFICE 2,266,294

WALL BRACKET FLOWERPOT HOLDER

Harry E. Allderdice, Modesto, Calif.

Application December 31, 1940, Serial No. 372,639

2 Claims. (Cl. 248—311)

This invention relates to a wall-bracket flower pot holder.

An object of the invention is the construction of a novel and efficient holder, which will support pots of different sizes, and when desired a saucer may be placed under the pot, since the device can be easily adjusted for the purpose desired.

Another object of the invention is the construction of a novel and efficient flower pot holder, which is practically invisible on the wall when the pot is in position, containing a growing plant; there are no ugly parts to my holder, and it does not detract in any degree from the flower pot or a plant contained therein.

A still further object of the invention is the construction of a novel and efficient flower pot holder which is comparatively inexpensive to manufacture, attractive in appearance and very durable in construction.

With the foregoing and other objects in view, the invention comprises certain novel constructions, combinations, and arrangements of parts as will be hereinafter fully described, illustrated in the accompanying drawing, and more particularly pointed out in the appended claims.

In the drawing:

Figure 1 is a view partly in side elevation and partly in vertical section of a device constructed in accordance with the present invention.

Figure 2 is a bottom plan view.

Figure 3 is a sectional view, taken on line 3—3, Figure 1, and looking in the direction of the arrows.

Figure 4 is a sectional view, taken on line 4—4, Figure 1, and looking in the direction of the arrows.

Figure 5 is a perspective view of the bracket unit.

Figure 6 is a perspective view of the anchor unit.

Figure 7 is a perspective view of another embodiment of the present invention.

Figure 8 is an enlarged sectional view, taken on line 8—8, Figure 7, and looking in the direction of the arrows.

Referring to the drawing, in which I have shown the embodiments of my invention, 1 designates the bracket unit and 2 is the anchor unit, comprising the whole device. The bracket unit comprises a flat or horizontal base portion 3, that is substantially Y-shape. By reason of this Y-shape structure less material is needed in forming the device, while a broad base is provided, that engages the bottom of the pot 4, Fig. 2. Integral with the horizontal portion 3 is a vertical portion 5, which portion 5 is provided preferably with horizontal apertures 6; these apertures are for suitable screws 7, for holding the device upon a suitable support. Between the apertures 6 is a hollow holder unit 8; this hollow holder unit is open at its upper and lower ends, and it may be made of lighter metal than the portions 3 and 5.

The anchor unit 2 is substantially U-shape in structure, comprising a comparatively long portion 9 and a short portion 10. The long portion 9 is adapted to extend into the holder unit 8, with the short portion 10 extending down in the pot 4. When the pot 4 is resting on the horizontal portion 3, with the short portion 10 extending into the pot, as clearly shown in Figure 1, said pot will be securely retained in position upon the device. Further, by the pot being preferably taller than the device is high, the effect is most pleasing, which is also true when a growing plant is in the pot, because no unsightly portion of any device is shown to view.

It is also to be noted that by positioning the top of the holder unit 8 below the upper aperture 6, there is room allowed for pots of varying heights to be placed upon the device, yet, each pot is held securely in position by the "tongue" or short portion 10 of the anchor unit extending into the pot. In other words, there is an adjustment of the anchor device, upon the holder unit, which permits placing of varying height pots upon the base portion 3, without anything objectionable appearing above the top edge of the pot, such as an upwardly-extending bracket or the like.

In the embodiment shown in Figures 7 and 8, the bracket unit 1ᵃ is made of wire, and comprises two parallel portions 11 that terminate at their lower ends into outwardly-extending prongs 12, that constitutes a Y-shape structure. A band or holder unit 13 is placed upon said parallel portions 11, with screws 14 extending therethrough, whereby the device may be held securely to a suitable support. An anchor device or unit 15 is formed of wire, and the two prongs 16 extend down into the holder unit 13, against the portions 11, whereby the anchor unit is slidably mounted upon the holder unit, and can be adjusted upon said unit for accommodating the height of the pot to be held in position. The anchor unit 15 is provided with the short portion 10ᵃ, for the same purpose as described in connection with the portion 10.

It is to be understood that the anchor unit can be forced down further than shown in Figure 1. In other words, the short portion 10 can be forced down into the pot, with the upper curved portion of the anchor unit fitting snug against the top rim of the pot, whereas in Figure 1 it is shown slightly above this edge or rim.

This device is suitable for use in a house, or on a fence or post, or in any convenient place for supporting a pot or jar.

While I have described the preferred embodiments of my invention and illustrated the same in the accompanying drawing, certain changes or alterations may appear to one skilled in the art to which this invention relates during the extensive manufacture of the same and I, therefore, reserve the right to make such changes or alterations as shall fairly fall within the scope of the appended claims.

What I claim is:

1. In a device of the class described, the combination of a bracket unit comprising a Y-shape base, and an integral upstanding portion, said vertical portion provided with an upper and a lower aperture, a hollow holder unit fixedly secured to said vertical portion between said apertures, a substantially U-shape anchor unit, and a portion of said anchor unit slidably mounted within said hollow holder.

2. In a device of the class described, the combination of a bracket unit comprising parallel wire portions, said wire portions terminating at the lower ends in outwardly-extending prongs constituting a Y-shape portion, a band upon said parallel wire portions, screws extending through said band between said parallel wire portions, an anchor unit formed of wire, and including two prongs, and said prongs extending into said band between the band and said parallel wire portions.

HARRY E. ALLDERDICE.